M. JOHNSON,
Assignor, by mesne assignments, to C. LA DOW.
Plow.
No. 9,032. Reissued Jan. 6, 1880.
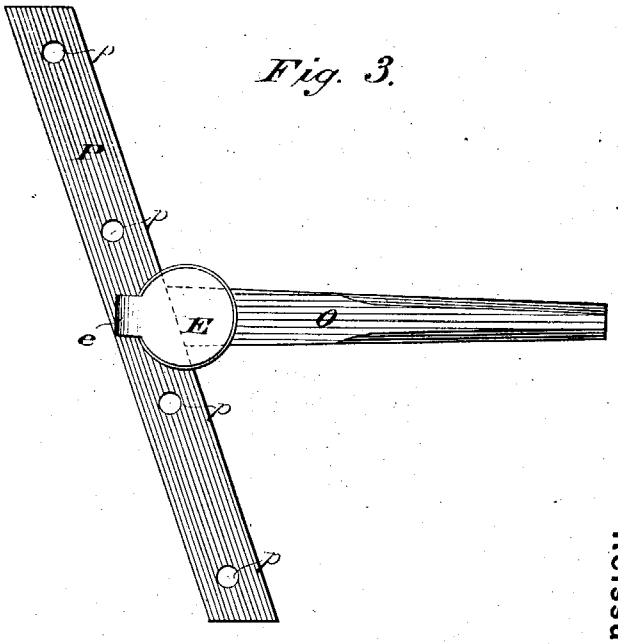
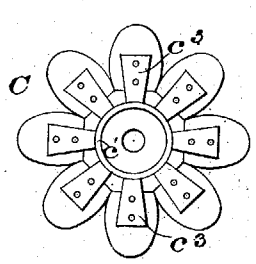
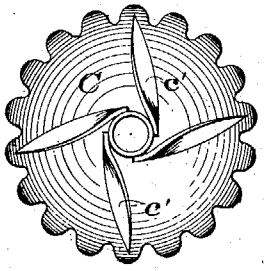
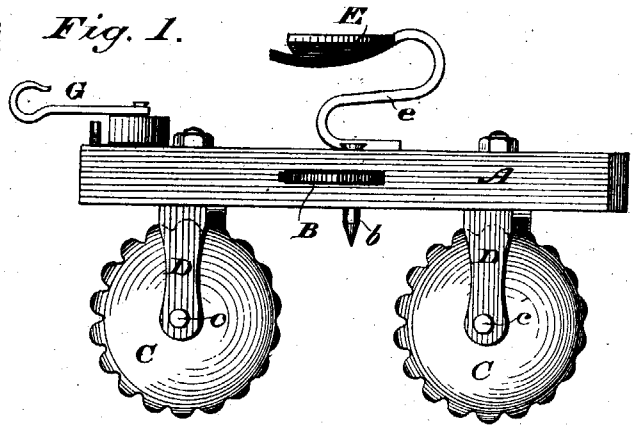
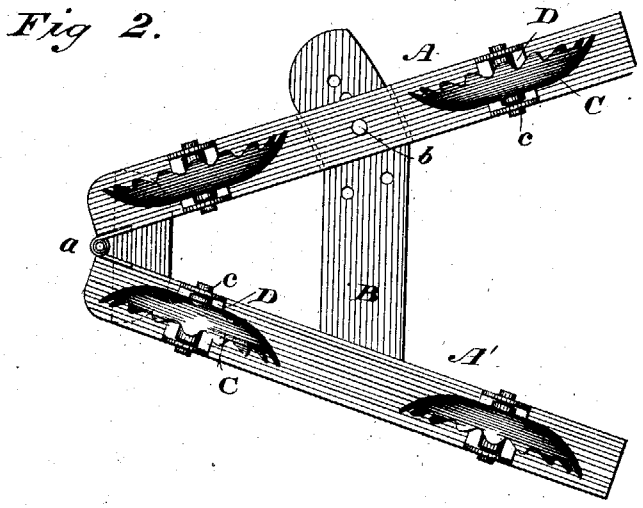
WITNESSES
Wm A. Skinkle
Geo W. Breck
Charles La Dow ASSIGNEE OF
By his Attorneys Moses Johnson INVENTOR
Baldwin, Hopkins & Peyton.

UNITED STATES PATENT OFFICE.

MOSES JOHNSON, OF LOCKPORT, NEW YORK, ASSIGNOR, BY MESNE ASSIGNMENTS, TO CHARLES LA DOW.

PLOW.

SPECIFICATION forming part of Reissued Letters Patent No. 9,032, dated January 6, 1880.

Original No. 85,451, dated December 29, 1868. Application for Reissue filed November 11, 1879.

DIVISION B.

*To all whom it may concern:*

Be it known that I, MOSES JOHNSON, formerly of Three Rivers, in the county of St. Joseph and State of Michigan, but now residing at Lockport, in the county of Niagara and State of New York, have invented certain new and useful Improvements in Plows, of which I hereby declare the following to be a full, clear, and exact description, reference being had to the accompanying drawings, making a part of this specification, in which drawings—

Figure 1 represents a side elevation of one form of the machine; Fig. 2, an inverted plan view thereof. Fig. 3 represents the organization of mechanism herein claimed. Figs. 4 and 5 represent views of the concave sides of the wheels, showing different modifications thereof.

My invention relates to that class of plows or earth-turning machines commonly known as "wheel-harrows" or "disk-cultivators," in which rotating wheels or disk-cutters are employed for turning sidewise or inverting the furrows or pulverizing the soil.

So far as my knowledge extends, all wheel-harrows prior to my invention consisted of three classes: first, of wheel-gangs mounted on non-adjustable axles constituting a harrow-frame; secondly, of non-adjustable wheel-gangs connected with a draft-frame; and, thirdly, of a main frame mounted on carrying-wheels and provided with disks or rotating teeth independently adjustable relatively to the line of draft.

The object of my invention is to combine the advantages incident to the organizations of these three classes of machines, while obviating the disadvantages to which they are subject, and to secure a cheap, simple, durable, and effective working machine, which ends I attain by combining a tongue attached directly to a transverse beam, constituting the frame of the machine, and connecting the stirrups in which the wheels revolve with said transverse beam by an adjustable clamp, which permits the angle of the wheels relatively to the line of draft to be varied and holds them securely in their adjusted position.

My invention further consists in combining a tongue, a transverse beam attached directly thereto, wheel or disk cutters secured to the transverse beam, and a seat for the driver, mounted directly over said beam and tongue, whereby the machine is rendered compact and the weight of the driver brought to bear directly upon the cutting-disks.

Figs. 1 and 2 of the drawings show a wheel-harrow the frame of which consists of two side beams or gang-bars, A A′, united at their inner ends by a hinge, *a*, which permits their relation to each other and to the line of draft to be varied. A punctured arm or cross-brace, B, connects these beams securely together. This cross-brace passes through a slot in one of the beams, and the parts are securely fastened together in any desired position by means of a pin, *b*, passing through a hole in the side beam and through one of the series of holes in the cross-brace. By this means I am not only enabled to regulate the distance between the wheels of each gang, but to gage the depth and width of the furrow to be plowed. For instance, to plow a deep furrow, I adjust the beam to a sharp angle, the rule being the sharper the angle the deeper the furrow, and vice versa.

The wheels G are represented as of concavo-convex shape, with their peripheries indented or corrugated, these corrugations being made sharp to enable them to penetrate the ground with greater ease. I prefer to connect these wheels with their respective gang-beams by mounting them on axles *c* in stirrups D, between the branches of which they revolve, the upper end of the stirrup terminating in a pivot-bolt passing through the beam and secured by a nut, thus constituting an adjusting-clamp of well-known construction, by means of which the wheels are not only firmly connected with the beams, but their angle of adjustment relatively to the beam or to the line of draft can be varied without moving the beam. The wheels may also be attached to the beams by various other well-known means. The wheel shown in Fig. 4, for example, is so constructed as to adapt it to revolve loosely around a stationary axle, instead of being attached to an axle revolving in bearings in the stirrups.

When my device is to be used for cultivating corn, potatoes, and the like, it is sometimes desirable to adjust the wheels on both beams, so that the convex side of the wheels shall all stand one way, by which means the furrow will be turned one way only, either to the right or left, as the operator may desire.

The fact that these wheels perform their office by a revolving motion, instead of the straight shoveling process of the common plow, secures for my plow a great saving of motive power, as is well understood.

The form of wheel shown in Fig. 4 is substantially the one I design for ordinary use. It is shown as provided with wings $c'$, tangential to the axle, which, when in use, aid in segregating and loosening the soil.

Fig. 5 shows a method by which I sometimes construct the corrugated wheel, which is therein represented as composed of a hub, $c^2$, resembling the common hub for wagon-wheels, and is also provided with arms $c^3$, to which corrugated concavo-convex flanges are firmly attached. This form of wheel is light and strong, and enables worn-out or broken flanges to be readily removed or replaced.

A driver's seat, E, is shown as supported by a standard, $e$, mounted on the cross-brace B of the frame.

In Figs. 1 and 2 the draft-connection is shown as consisting of a hook, G, to which the motive power is applied, said hook being attached at a point at or near the central line or hinge-connection of the gang-beams.

Fig. 3 represents my device in a form especially applicable to field-plowing. It consists of a tongue, O, to which a transverse cross-bar, P, is attached at an angle of about fifty degrees with the tongue, in order to place the concavo-convex wheels in the proper line with the draft. I usually place twelve such wheels on this beam P, and I find a team of good horses abundantly sufficient for its use, even in greensward.

The letters $p$ $p$ on the cross-beam show the points at which the wheels are attached.

For greensward or rooty soil, it is desirable to place revolving cutters on the beam P in front of the wheels.

The organization of instrumentalities shown in Figs. 1 and 2 is not, however, claimed herein, as such organization forms the subject-matter claimed in another division of this application.

Having thus described my improvements in plows, what I claim as of my own invention is—

1. The combination, substantially as herein-before set forth, of the tongue, the cross-beam connected therewith, the wheels which support said beam, and mechanism, substantially such as described, for adjusting the angle of the wheels relatively to the line of draft.

2. The combination, substantially as herein-before set forth, of the tongue, the cross-beam connected therewith, the wheels which support said beam, mechanism, substantially such as described, for adjusting the angle of the wheels relatively to the line of draft, and a driver's seat mounted on the cross-beam.

In witness that I claim the foregoing as my own I have hereunto set my hand and affixed my seal in the presence of two witnesses.

MOSES JOHNSON. [L. S.]

Witnesses:
C. M. SOUTHWORTH,
ALFRED H. ROWELL.